(12) United States Patent
Gioia et al.

(10) Patent No.: US 12,197,171 B2
(45) Date of Patent: Jan. 14, 2025

(54) METHOD FOR CONSTRUCTING A DIGITAL HOLOGRAM AND ASSOCIATED DIGITAL HOLOGRAPHY SYSTEM

(71) Applicant: FONDATION B-COM, Cesson Sevigne (FR)

(72) Inventors: Patrick Gioia, Servon-sur-Vilaine (FR); Antonin Gilles, Rennes (FR)

(73) Assignee: FONDATION B-COM, Cesson Sevigne (FR)

(*) Notice: Subject to any disclaimer, the term of this patent is extended or adjusted under 35 U.S.C. 154(b) by 493 days.

(21) Appl. No.: 17/601,323

(22) PCT Filed: Mar. 30, 2020

(86) PCT No.: PCT/EP2020/059007
§ 371 (c)(1),
(2) Date: Oct. 4, 2021

(87) PCT Pub. No.: WO2020/201232
PCT Pub. Date: Oct. 8, 2020

(65) Prior Publication Data
US 2022/0187766 A1 Jun. 16, 2022

(30) Foreign Application Priority Data
Apr. 5, 2019 (FR) ........................................ 1903649

(51) Int. Cl.
*G03H 1/22* (2006.01)
(52) U.S. Cl.
CPC ......... *G03H 1/2294* (2013.01); *G03H 1/2205* (2013.01); *G03H 2001/221* (2013.01); *G03H 2223/17* (2013.01); *G03H 2225/00* (2013.01)

(58) Field of Classification Search
CPC ............... G03H 1/2294; G03H 1/2205; G03H 2001/221; G03H 2223/17; G03H 2225/00; G03H 2001/0224
(Continued)

(56) References Cited

U.S. PATENT DOCUMENTS

| 10,698,365 | B2* | 6/2020 | Shi ........................ G03H 1/0841 |
| 2004/0042161 | A1* | 3/2004 | Cameron .................. G03H 1/22 |
| | | | 361/679.01 |

(Continued)

OTHER PUBLICATIONS

Ichikawa et al., "Realistic 3D image reconstruction in CGH with Fourier transform optical system," Proc. of SPIE, vol. 8644, 2013, 9 pages.
(Continued)

*Primary Examiner* — Audrey Y Chang
(74) *Attorney, Agent, or Firm* — NIXON & VANDERHYE

(57) ABSTRACT

Disclosed is a method for constructing a digital hologram to be displayed by of a display system. The display system includes a light modulator producing a light beam and a convergent optical device designed to make the light beam converge towards a focal point. The scene is defined by a set of luminous elements. The construction method includes a step of determining values respectively associated with the pixels of the digital hologram by summing the light contributions respectively produced by the luminous elements with weighting, for each of the light contributions, by a correction coefficient depending on the area of the intersection of a surface between the convergent optical device and the focal point, and a pencil of light having a predetermined angular opening and transmitted through the convergent optical device from the luminous element producing the light contribution concerned. An associated holographic system is also described.

20 Claims, 3 Drawing Sheets

(58) Field of Classification Search
USPC .................................................. 359/9, 29, 15
See application file for complete search history.

(56) References Cited

U.S. PATENT DOCUMENTS

2006/0256414 A1* 11/2006 Baba .................... G11B 7/0065
2010/0085276 A1*  4/2010 Cable ................... G03H 1/2294
                                                                  345/6
2013/0250049 A1   9/2013 Schwerdtner

OTHER PUBLICATIONS

Kim et al., "Effective generation of digital holograms of three-dimensional objects using a novel look-up table method," Applied Optics, vol. 47, No. 19, Jul. 1, 2008, 8 pages.
Takaki et al., "Band-limited zone plates for single-sideband holography," Applied Optics, vol. 48, No. 34, Dec. 1, 2009, 7 pages.
Antonin Gilles, et al., "Computer Generated Hologram from Multiview-plus-Depth data considering specular reflections", 2016 IEEE International Conference on Multimedia & Expo Workshops (ICMEW), Sep. 2016, 10 pages.
Antonin Gilles, et al., "Real-time layer-based computer-generated hologram calculation for the Fourier transform optical system", Applied Optics, vol. 57, No. 29, Oct. 10, 2018, 10 pages.
International Search Report for PCT/EP2020/059007 dated Apr. 24, 2020, 5 pages.
Written Opinion of the ISA for PCT/EP2020/059007 dated Apr. 24, 2020, 5 pages.

* cited by examiner

METHOD FOR CONSTRUCTING A DIGITAL HOLOGRAM AND ASSOCIATED DIGITAL HOLOGRAPHY SYSTEM

BACKGROUND OF THE INVENTION

Field of the Invention

The present invention generally relates to the technical field of digital holography.

It more particularly relates to a method for constructing a digital hologram and an associated digital holography system.

Description of the Related Art

Digital holography aims to reconstruct a three-dimensional scene for an observer by displaying a digital hologram by means of a light modulator.

The field of view obtained can however be limited and too restricted for the chosen application (the angle of emission being directly linked to the pixel density of the light modulator).

In order to enlarge the field of view (which is interesting in particular in case of Augmented Reality where it is desired to superimpose the displayed hologram on the real environment of the observer), it has already been proposed to display the digital hologram by means of a display system comprising a light modulator producing a light beam and a converging optical device designed to make the light beam converge towards a focal point. Such a system is commonly called FTOS (for "Fourier Transform Optical System").

Hence, by placing the observer's eye between the converging optical device and the focal point (typically near the focal point), the observer's field of view is widened.

SUMMARY OF THE INVENTION

In this context, the invention proposes a method for constructing a digital hologram representing a scene and intended to be displayed by means of a display system comprising a light modulator producing a light beam and a converging optical device designed to make the light beam converge towards a focal point, the scene being defined by a set of luminous elements, characterized in that it comprises a step of determining values respectively associated with pixels of the digital hologram by summing the light contributions respectively produced by luminous elements with weighting, for each of the light contributions, by a correction coefficient depending on the area of the intersection of a surface located between the converging optical device and the focal point, and a pencil of light having a predetermined angular aperture and transmitted through the converging optical device from the luminous element producing the concerned light contribution.

The use of the correction coefficient makes it possible to take into account in advance (during the construction of the digital hologram) the fact that certain light rays produced by the light modulator are only partially received by the observer's pupil (phenomenon that is amplified by the convergence of these rays produced by the converging optical device). The reproduction of the three-dimensional scene by the display system is hence improved.

Other non-limitative and advantageous features of the product/method according to the invention, taken individually or according to all the technically possible combinations, are the following:

the luminous elements are located on a plurality of points of the scene, respectively;

the method comprises, for each point of said plurality, a step of calculating, as a function of the position of the concerned point, the correction coefficient weighting the light contributions produced by the luminous element located at the concerned point;

the step of determining values comprises, for each pixel of the digital hologram, a step of determining the field generated, at the concerned pixel, by a luminous element located at a given point and a step of weighting the determined field by the correction coefficient calculated for the given point;

the luminous elements are located in at least one plane;

the step of determining values comprises a step of propagating the light field from a first plane to a second plane adjacent to the first plane, with application of a matrix mask (or compensation mask) whose elements are respectively associated with the different points of the first plane and have a value depending on the area of the intersection of said surface and a pencil of light having the predetermined angular aperture and transmitted through the converging optical device from the point associated with the concerned element;

the method comprises a step of displaying the constructed digital hologram, by means of the display system;

the display system comprises a shutter interposed between two lenses;

the orientation of the shutter is determined as a function of the distribution of the luminous elements in angular sectors defined about the axis of the display system;

the determined field is zero if the pencil of light emitted by the luminous element located at the given point with said predetermined angular aperture is entirely intercepted by the shutter;

the two lenses have a same focal distance;

the shutter is separated from each of the two lenses by a distance equal to the focal distance;

said surface is a disk centered on the optical axis of the converging optical device;

the predetermined angular aperture is the angular aperture of the light beam generated by the light modulator.

The invention also proposes a digital holography system comprising a module for constructing a digital hologram representing a scene and intended to be displayed by means of a display system comprising a light modulator producing a light beam and a converging optical device designed to make the light beam converge towards a focal point, the scene being defined by a set of luminous elements, characterized in that the construction module is designed to determine values respectively associated with pixels of the digital hologram by summing light contributions respectively produced by luminous elements with weighting, for each of the light contributions, by a correction coefficient depending on the area of the intersection of a surface located between the converging optical device and the focal point, and a pencil of light having a predetermined angular aperture and transmitted through the converging optical device from the luminous element producing the concerned light contribution.

Such a holography system can further comprise the above-mentioned display system.

Of course, the different features, alternatives and embodiments of the invention can be associated with each other according to various combinations, insofar as they are not mutually incompatible or exclusive.

BRIEF DESCRIPTION OF THE DRAWINGS

Moreover, various other features of the invention will be apparent from the appended description made with reference to the drawings that illustrate non-limitative embodiments of the invention, and wherein.

DESCRIPTION OF THE PREFERRED EMBODIMENTS

Figure 1:
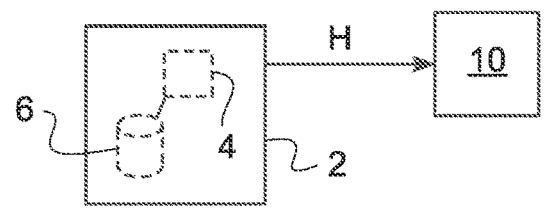
FIG. 1 shows the main elements of a digital holography system as proposed by the invention.

The digital holography system described hereinafter and shown in FIG. 1 comprises a module 2 for constructing a digital hologram H and a system 10 for displaying the digital hologram H.

The construction module 2 herein comprises a processor 4 and at least one memory 6 (such as a random memory or a rewritable non-volatile memory; it could however be, as an alternative, a drive disk). The construction module 2 is for example a computer.

As explained in the following, the memory 6 memorizes data representative of a scene to be represented. The memory 6 can also memorize variables used during the construction of the digital hologram H, as will described hereinafter.

The memory 6 further memorizes computer program instructions designed, when executed by the processor 4, to implement the different operations described hereinafter and allowing the construction of the digital hologram H.

The display system 10 comprises a light source 11 (herein monochromatic of wavelength λ), a light modulator 12 producing a light beam (by modulation of the light emitted by the light source 11) and a converging optical device 14 designed to make this light beam converge towards a focal point A, as will be described hereinafter with reference to FIG. 2.

According to a first possible embodiment, the construction module 2 and the display system 10 can be gathered within a same holographic viewing device. The digital hologram H can then be transmitted from the construction module 2 to the display system 10 by means of an internal bus of this holographic viewing device.

According to a second possible embodiment, the construction module 2 and the display system 10 can be spaced apart from each other; the construction module 2 being for example located in a remote server with which the display system 10 exchanges data via at least one communication network. In this case, the digital hologram H can be transmitted (for example as coded data representing this digital hologram H) via this communication network.

Figure 2:
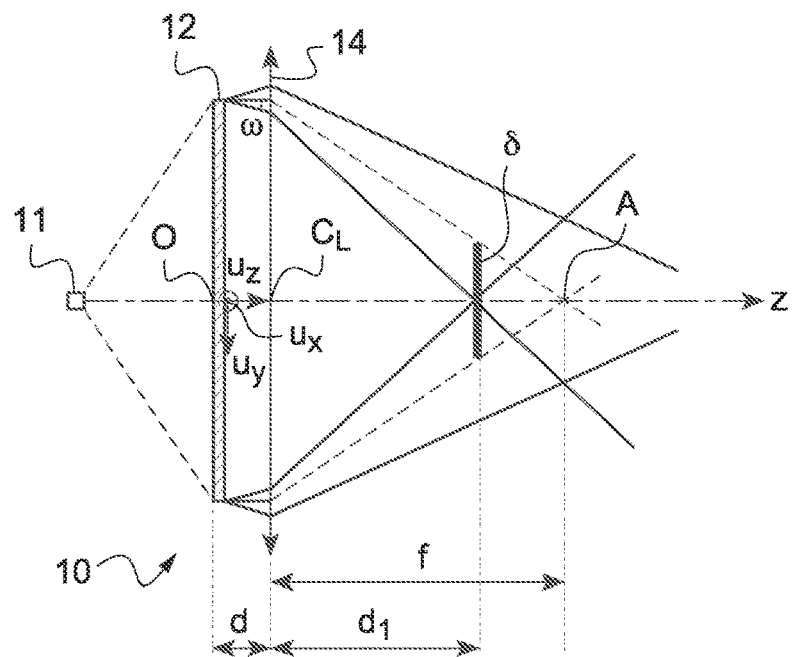
FIG. 2 is a schematic illustration of a display system of the digital holography system of FIG. 1.

FIG. 2 shows the main elements of the display system 10.

As already indicated, the display system 10 comprises a light source 11, a light modulator 12 (for example, of the "Spatial Light Modulator", SLM, type) and a converging optical device, here a converging lens 14.

An orthonormal reference system R (O, $u_x$, $u_y$, $u_z$) is used in the following of the description, where O is the center of the light modulator 12, the vector $u_z$ is orthogonal to the plane of the light modulator 12 and directed in the direction of propagation of the light beam generated by the light modulator 12, and the vectors $u_x$ and $u_y$ are parallel to the long and short edges of the light modulator 12, respectively.

As can be seen in FIG. 2, the optical axis Oz of the display system 10 is the axis colinear to the vector $u_z$ passing through the point O.

In the display system 10, the converging lens 14 is positioned perpendicular to the optical axis in such a way that the optical axis Oz passes through the center $C_L$ of this converging lens 14. In other words, the axis of the converging lens 14 is merged with (or identical to) the optical axis Oz.

The plane of extension of the light modulator 12 and the plane of extension of the converging lens 14 are hence parallel to each other.

Let's note d the distance separating the image plane (i.e., in the embodiment of FIG. 2, the plane of the light modulator 12) and the converging lens 14 (i.e., here, d=$OC_L$).

A light ray emitted perpendicular to the light modulator 12, and hence incident on the converging lens 14 along the axis of this converging lens 14, will hence be transmitted (after having passed through the converging lens 14) towards the focal point A (located on the optical axis Oz). Let's note f the focal distance of the converging lens 14: f=$AC_L$.

As shown in FIG. 2, the light beam generated by the light modulator 12 has an angular aperture ω (variable according to the type of light modulator 12 used).

Moreover, the pupil of the user that observes the light beam generated by the light modulator 12 after having passed through the converging lens 14 is represented by a disk δ. As explained hereinafter, the disk δ corresponding to the user's pupil is positioned between the converging lens 14 and the focal point A.

This disk δ (i.e. the user's pupil) is considered as being perpendicular to the optical axis Oz and centered on the optical axis Oz. It is also considered here that the disk δ is located on the optical axis Oz at the closest point from the center $C_L$ of the converging lens 14 that receives light rays from the whole light modulator 12. In other words, as can be seen in FIG. 2, the disk δ is considered as being positioned at the point of the optical axis Oz that is the closest to the converging lens 14 and that is touched by a ray emitted with an angle equal to the angular aperture w from a peripheral pixel of the light modulator 12.

This situation of the disk δ (i.e. the user's pupil) is optimum in that it allows maximizing the user's field of view while allowing the latter to see the whole hologram formed by the light beam.

As can be seen in FIG. 2, the distance between the converging lens 14 and the disk δ representing the user's pupil is denoted $d_1$.

Figure 3:
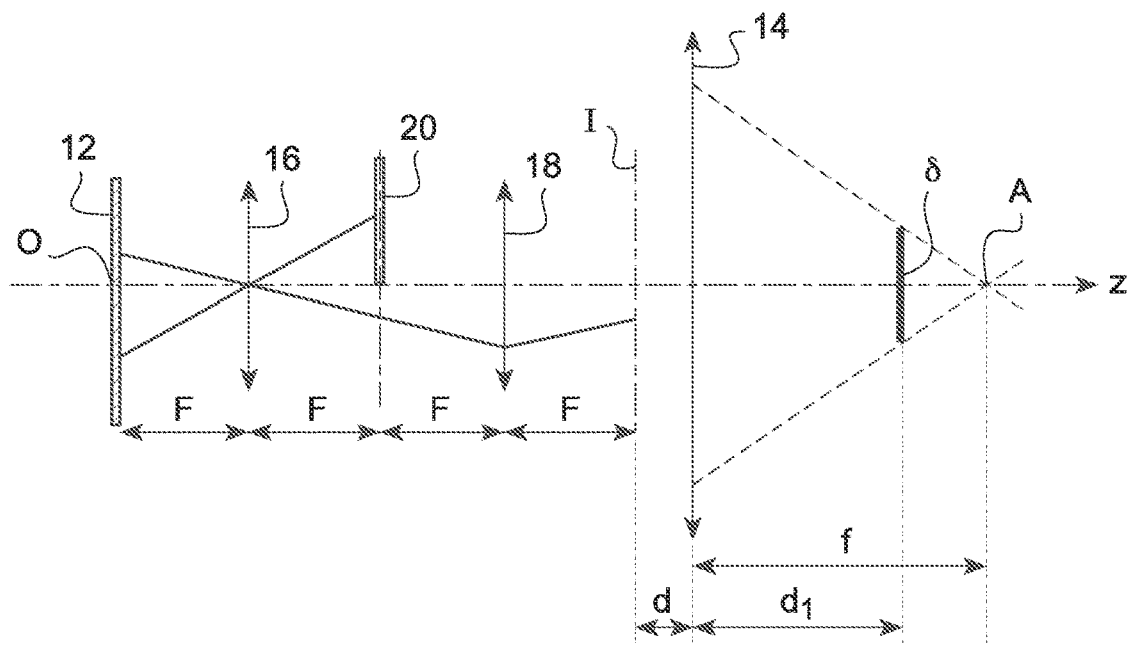
FIG. 3 shows a possible embodiment of a part of the display system of FIG. 2.

FIG. 3 shows a possible embodiment of the display system 10 according to which a so-called 4F filtering technique is used to eliminate a symmetric ray generated by the light modulator 12.

According to this technique, an optical unit comprising a shutter 20 interposed between two lenses 16, 18 is provided downstream from the light modulator 12.

The two lenses 16, 18 have a same focal distance F and the shutter 20 is separated from each of the two lenses 16, 18 by a distance equal to the focal distance F.

The light modulator 12 is itself positioned upstream from the first lens 16, at a distance equal to the focal distance F.

The display system 10 hence comprises successively, along the optical axis Oz and with a spacing equal to the focal distance F between two successive elements: the light modulator 12, the first lens 16, the shutter 20, the second lens 18 and an image plane I.

The shutter 20 stops the light rays crossing a given half-plane and let through the light rays located in the complementary half-plane in such a way that a light beam corresponding to the beam generated by the light modulator 12 is generated at the image plane I, but with elimination of a part of the spatial frequency components.

Reference can be made to the article "*Band-limited zone plates for single-sideband holography*", Y. Takaki and Y. Tanemoto, in Appl. Opt. 48, H64-H70 (2009), for more details about this filtering technique.

In this exemplary embodiment, the above-mentioned distance d is hence equal to the distance between the image plane I and the converging lens 14, as indicated in FIG. 3.

The shutter 20 can be fixed (in which case the half-plane stopping the light rays is constant). As an alternative, a transmissive modulator can be used (as a shutter 20) in order to chose for each frame the half-plane in which the rays are stopped.

Hereinafter, $\theta_0$ denotes the angle formed, in the plane of the shutter 20, between an edge of the shutter 20 and the direction Ox, in such a way that, for a point M of coordinates (x, y, z) in the reference system R and located in the plane of the shutter 20, the cylindrical coordinates ($\rho$, $\theta$, h) of M are such that $\rho=SQRT(x^2+y^2)$, $\theta=a\tan 2(y,x)$, $z=h$ and the point M is located in the half-plane of the shutter 20 if and only if $\theta_0 < \theta < \theta_0 + \pi$ (where SART is the square root function).

The value of the angle $\theta_0$ is fixed when the shutter 20 is fixed, or variable (from one frame to the other one) when the position of the shutter is adjustable (using a transmissive modulator, as indicated hereinabove).

Figure 4:
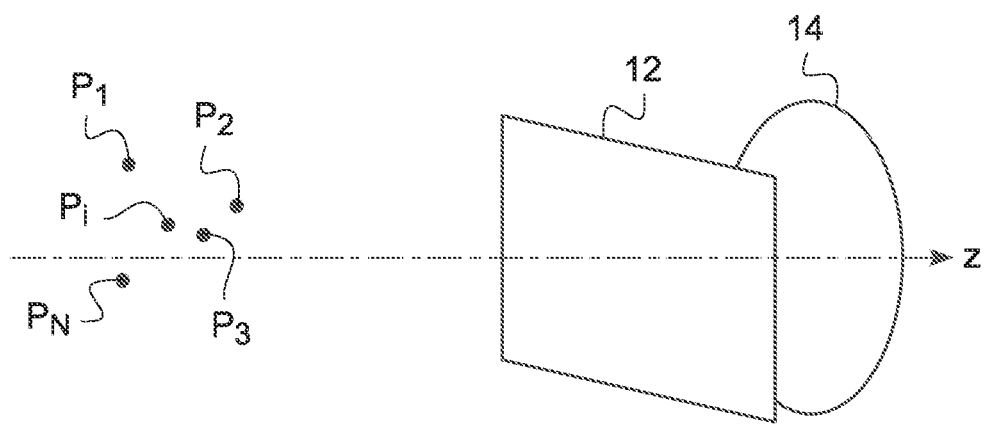
FIG. 4 illustrates the construction of a digital hologram from luminous elements located at different points of a scene.

The construction of a digital hologram H intended to be displayed by means of the display system 10 from luminous elements located at different points $P_1$, $P_2$, $P_3$, $P_i$, $P_N$ (here at N different points) of a scene to be represented will now be described, with reference to FIG. 4. The luminous intensity of the luminous element located at point $P_i$ is denoted $A_i$.

The coordinates ($x_i$, $y_i$, $z_i$) of the points $P_i$ and the luminous intensity $A_i$ of the luminous elements located at points $P_i$ are here memorized in the memory 6.

The construction of the digital hologram H is described here for one frame. This construction can be repeated for other frames when the scene is changed.

When the orientation of the shutter 20 is adjustable, the construction module 2 first determines the orientation of the shutter 20 (i.e. the above-mentioned angle $\theta_0$) as a function of the distribution of the luminous elements in angular sectors defined about the optical axis Oz of the display system 10.

In practice, a predetermined number k of angular sectors and a function S(n) that indicates the number of points Pi in the angular sector of index n (with n between 1 and k) are used:

$S(n)=\text{card}\{Pi|2\pi\cdot(n-1)/k \leq \theta(Pi) < 2\pi\cdot n/k\}$, where $\theta(Pi)$ is the second cylindrical coordinate of point $P_i$: $\theta(P_i)=a\tan 2(y_i,x_i)$.

By defining $X_\theta$ as a random variable of probability density S(n) after normalization, the construction module 2 can chose a realization m of the random variable $X_\theta$ (by simulation using a pseudo-random method, for example by reduction to a uniform probability law) and hence determine the angle $\theta_0$:

$\theta_0 = (2m+1) \cdot \pi/k$.

The construction module 2 then proceeds to the construction of the digital hologram H. For that purpose, the following operations are implemented for each pixel $p_{k,l}$ of indices k, l of the light modulator 12.

Hereinafter, ($x_{k,l}$, $y_{k,l}$, $z_{k,l}$) will denote the coordinates of pixel $p_{k,l}$ in the reference system R and ($\rho_{k,l}$, $\theta_{k,l}$, $h_{k,l}$) the associated cylindrical coordinates thereof: $\rho_{k,l}=SQRT(x_{k,l}^2+y_{k,l}^2)$, $\theta=a\tan 2(y_{k,l},x_{k,l})$, $Z_{k,l}=h_{k,l}$.

For each point $P_i$ of the scene, the construction module 2 can hence determine the distance $d_{i,k,l}$ between point $P_i$ and pixel $p_{k,l}$, and the field $c_{i,k,l}$ generated, at pixel $p_{k,l}$, by the luminous element located at point $P_i$:

$d_{i,k,l}=SQRT((x_{k,l}-x_i)^2+(y_{k,l}-y_i)^2+(z_{k,l}-z_i)^2)$ $c_{i,k,l}=0$ if $\theta_0 < \theta_{k,l} < \theta_{0+\pi}$, or else $c_{i,k,l}=Ai \cdot \exp(2\pi \cdot j \cdot d_{i,k,l}/\lambda)$, where exp is the exponential function, $\lambda$ the wavelength of the light used and j the imaginary unit: $j^2=-1$.

The construction module 2 then weights the contribution $c_{i,k,l}$ of the luminous element located at point $P_i$ (contribution $c_{i,k,l}$ to the field, as just determined) by a correction coefficient $\psi(P_i)$ calculated as described hereinafter with reference to FIGS. 6 et 7 to take into the fact that only a part of the user's pupil (represented by the disk $\delta$) receives the light beam generated by the light modulator 12 (as explained hereinafter with reference to FIG. 6).

The so-obtained weighted contribution is thus equal to:

$c'_{i,k,l}=\psi(P_i) \cdot c_{i,k,l}$.

The construction module 2 can then determine the field $F_{k,l}$ produced at pixel $p_{k,l}$ by the set of N points $P_i$ by summing the weighted contributions $c'_{i,k,l}$ of the different points $P_i$ determined hereinabove:

$F_{k,l}=\Sigma_{1 \geq i \geq N} c'_{i,k,l}$.

The construction module 2 can hence determine the value $H_{k,l}$ of the digital hologram H for pixel $p_{k,l}$: $=(F_{k,l}+A)^2$, where A is the complex amplitude of the reference wave.

By performing the following operations for all the pixels $p_{k,l}$, the construction module 2 hence determines the values $H_{k,l}$ respectively associated with these pixels $p_{k,l}$ by summing (as explained hereinabove) the light contributions $c_{i,k,l}$ respectively produced by the luminous elements located at points $P_i$ with weighting, for each of the light contributions $C_{i,k,l}$, by a correction coefficient $\psi(P_i)$ depending on the point $P_i$.

The construction of a digital hologram H intended to be displayed by means of a display system 10 from a distribution of luminous elements in a set of N planes each comprising an image $I_i$ (pour $1 \leq i \leq N$) will now be described with reference to FIG. 5.

These N images $I_i$ are respectively located in planes of equation $z=z_{i-1}$, the light modulator 12 being located in the plane of equation $z=z_N$ (with $z_N=0$).

The content of the images $I_i$ (defined by the light contributions, here the amplitude $I_i(x,y)$ of the light wave, at the points of coordinates (x,y) of the concerned plane of equation $z=z_{i-1}$) is herein memorized in the memory 6.

In the described example, the memory 6 also memorizes binary masks $O_i$ respectively defining the occultations in the planes of equation $z=z_i$ (for $0 \le i \le N-1$).

The construction of the digital hologram H is described here for one frame. This construction can be repeated for other frames when the scene is changed.

When the orientation of the shutter 20 is adjustable, the construction module 2 first determines the orientation of the shutter 20 (i.e. the above-mentioned angle $\theta_0$) as a function of the distribution of the passing points (points of value 1) of the binary occultation masks $O_i$ in angular sectors defined around the optical axis Oz of the display system 10.

As in the case of the embodiment described hereinabove with reference to FIG. 4, a predetermined number k of angular sectors is used. The set of points in space associated with a pixel of value 1 in an occultation mask Oi is herein denoted S': S'={P(x,y,z)| there exists i such that $z=z_i$ and $O_i(x,y)=1$}.

A function S(n) that indicates the number of points of the set S' in the angular sector of index n (with n between 1 and k) can then also be used here:

S(n)=card $\{P \in S' | 2\pi \cdot (n-1)/k \le \theta(P) < 2\pi \cdot n/k\}$, where $\theta(P)$ is the second cylindrical coordinate of point P(x,y,z): $\theta(P)$=a tan 2(y,x).

By defining $X_e$ as a random variable of probability S(n) after normalization, the construction module 2 can choose a realization m of the random variable $X_e$ (by simulation using a pseudo-random method, for example by reduction to a uniform probability law) and hence determine the angle $\theta_0$:

$\theta_0=(2m+1) \cdot \pi/k$.

Figure 5:
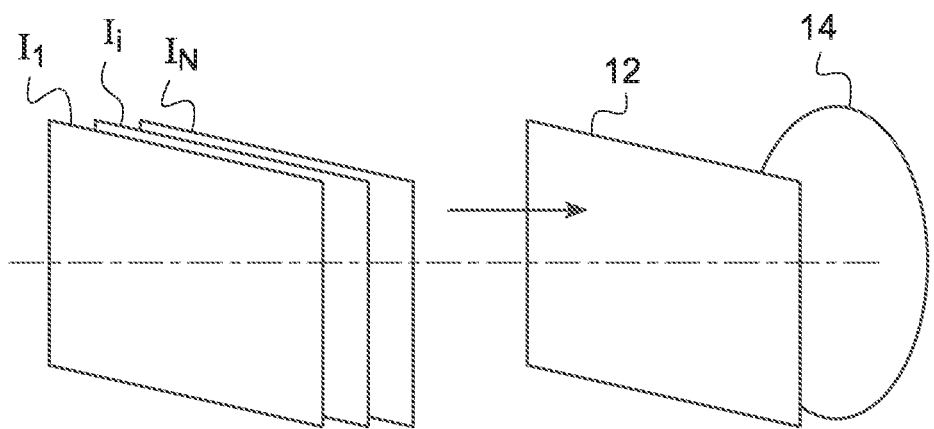
FIG. 5 illustrates the construction of a digital hologram from a distribution of luminous elements in a set of planes.

The construction module 2 then successively calculates the different fields $C'_i$ respectively present at the planes of equation $z=z_i$ (for i between 0 and N) by propagation from one plane to an adjacent plane as described now (and schematically shown by means of an arrow in FIG. 5).

The construction module 2 performs for that purpose the following operations for each plane (starting with the farthest plane from the light modulator 12, of equation $z=z_0$, and moving towards the light modulator 12), i.e. for i from 0 to N-1:

the construction module 2 applies to the propagated field $C_i$ the binary mask $O_i$ defining the occultations in the plane $z=z_i$, adds the contribution of the image $I_{i+1}$ located in the plane $z=z_i$, and applies a compensation mask $\psi_i$ defined hereinafter, for example as follows for the concerned points $(x,y,z_i)$:

$C'_i(x,y,z_i)=[I_{i+1}(x,y)+O_i(x,y) \cdot C_i(x,y,z_i)] \cdot \psi_i(x,y)$;

the construction module 2 propagates the so-obtained field C' up to the adjacent plane (of equation $z=z_{i+1}$) by means of a propagation operator $T_{zi}$:

$C_{i+1}=T_{zi}(C'_i)$.

The propagation operator $T_{zi}$ is here defined as follows:

$$[T_{zi}(C'_i)](x', y', z_{i+1}) = \sum_x \sum_y K_{\theta_0}(x, x', y, y', z_i, z_{i+1}) \cdot C'_i(x, y, z_i) \cdot \Delta x \cdot \Delta y$$

where $\Delta x$ and $\Delta y$ correspond to the discretization step of the operator (along direction Ox and direction Oy, respectively) and $K_{\theta_0}=\xi \cdot \Gamma_{\theta_0}$, the functions $\xi$ and $\Gamma_{\theta_0}$ being defined as follows:

$\xi(x,x',y,y',z,z')=K(x,x',y,y',z,z')$ if $y'<y$ $\xi(x,x',y,y',z,z')=0$ if $y' \ge y$ $\Gamma_{\theta_0}(x,x',y,y',z,z')=(\cos \theta_0 \cdot x - \sin \theta_0 \cdot y, \cos \theta_0 \cdot x' - \sin \theta_0 \cdot y', \sin \theta_0 \cdot x + \cos \theta_0 \cdot y, \sin \theta_0 \cdot x' + \cos \theta_0 \cdot y', z, z')$.

The compensation mask $\psi_i$ is a matrix mask whose elements are respectively associated with the different points of the plane of equation $z=z_i$. This matrix mask $\psi_i$ aims to compensate for the fact that only a part of the user's pupil (represented by the disk $\delta$) receives the light beam generated by the light modulator 12 (as explained hereinafter with reference to FIG. 6).

Each element is hence a correction coefficient $\psi(x,y,z_i)$ that depends on the concerned point, of coordinates $(x,y,z_i)$ in the plane of equation z=zi, similarly to what is mentioned hereinabove within the framework of the embodiment of FIG. 4. In other words, we have: $\psi_i(x,y)=\psi(x,y,z_i)$ (the calculation of the correction coefficient being described hereinafter with reference to FIGS. 6 and 7).

It is hence obtained, after propagation within the different planes, the field $C_N$ present at the plane of equation $z=z_N$ (plane of the light modulator 12).

The construction module 2 can hence determine the digital hologram H for the different points of the light modulator, as follows:

$H=(C_N+A)^2$, where A is the complex amplitude of the reference wave.

The determination of the correction coefficient $\psi$ aiming to compensate for the fact that only a part of the user's pupil (represented by the disk $\delta$) receives the light beam generated by the light modulator 12 will now be described with reference to FIG. 6.

As explained hereinabove, it is searched to determine the value of the correction coefficient $\psi$ associated with a point P of space of coordinates (x,y,z) (this value being denoted $\psi(P)$ within the framework of FIG. 4 and $\psi(x,y,z)$ within the framework of FIG. 5).

Figure 6:
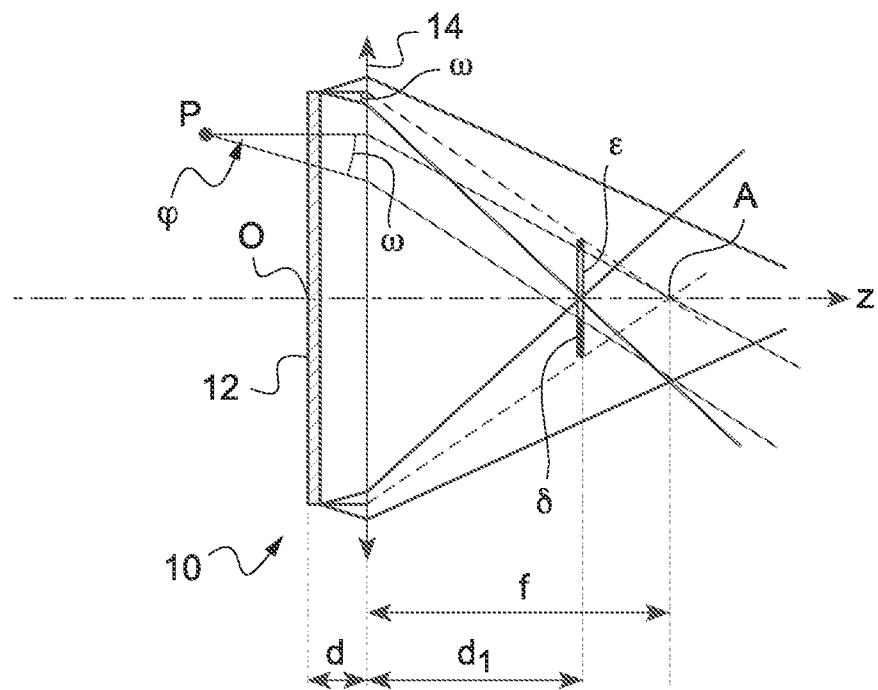
FIG. 6 illustrates the determination of a correction coefficient by taking into account a pencil of light propagating in the display system of FIG. 2.

A pencil of light $\varphi$ coming from the concerned point P and having an angular aperture $\omega$ corresponding to the angular aperture of the light modulator 12 is hence shown in FIG. 6. This angular aperture $\omega$ is hence here constant (whatever the concerned pixel of the light modulator 12, and hence of the digital hologram H).

The pencil of light $\varphi$ is transmitted at the output of the light modulator 12 (with its central ray perpendicular to the plane of the light modulator 12), then through the converging lens 14 (with its central ray consequently directed towards the focal point A).

As explained hereinabove, the disk $\delta$ (corresponding to the user's pupil) is positioned in such a way that a part at least of the pencil of light $\varphi$ crosses the disk $\delta$.

Figure 7:
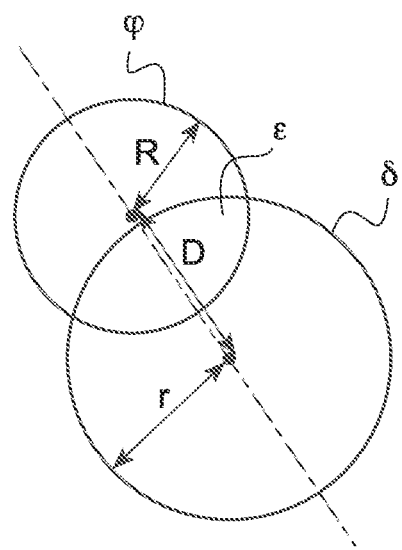
FIG. 7 shows the intersection of the pencil of light and a disk representing the pupil of a user of the display system.

In FIG. 7 are shown the disk $\delta$, the pencil of light $\varphi$ and their intersection $\epsilon$ in the plane of the disk $\delta$ (plane of equation $z=d+d_1$).

The area $\alpha$ of the intersection c of the disk $\delta$ and the pencil $\varphi$ is equal to:

$\alpha=R^2 \cdot (\beta-0.5 \cdot \sin \beta)+r^2 \cdot (\sigma-0.5 \cdot \sin \sigma)$ with $\beta=\arccos[(R^2+D^2-r^2)/(2 \cdot R \cdot D)]$ $\sigma=\arccos[(r^2+D^2-R^2)/(2 \cdot r \cdot D)]$ where (as can be seen in FIG. 7) r is the radius of the disk δ, R the radius of the intersection of the pencil of light φ and the plane of the disk δ, and D the distance between the center of the pencil of light φ and the center of the disk δ (that is to say the distance between the central ray of the pencil of light φ and the axis Oz at the plane of the disk δ), and hence:

D=ρ·(f−d$_1$)/f (considering the rectilinear character of the above-mentioned central ray), and R=[(1−[d−z]/f)·d$_1$+d−z]·tan ω, with ρ the distance between point P and axis Oz (or the first polar coordinate of point P): ρ=SQRT(x$^2$+y$^2$) and z the third cartesian coordinate of point P.

In practice, for example, for the radius r of the disk δ a mean value generally met for the radius of the human eye's pupil is used, i.e. for example a value between 4 mm and 8 mm, here 6 mm.

Moreover, let's remind that f, d, d$_1$ and ω are characteristics of the display system 10 presented hereinabove with reference to FIG. 2.

The construction module 2 can hence determine (by means of the above formulas) the area α of the intersection ε as a function of the coordinates (x,y,z) of the concerned point P.

The construction module 2 can determine on this basis the value of the correction coefficient ψ associated with the point P of coordinates (x,y,z):

$$\psi(P)=\pi \cdot r^2/\alpha(x,y,z).$$

This correction coefficient ω (P) is inversely proportional to the proportion of the disk δ (corresponding to the user's pupil) receiving the pencil of light φ in such a way that, by weighting a light contribution received from the point P by this correction coefficient ψ (P) as proposed hereinabove, the fact that only this proportion of the user's pupil (represented by the disk δ) receives this pencil of light φ is compensated for.

Of course, various other changes can be made to the invention within the framework of the appended claims.

The invention claimed is:

1. A method for constructing a digital hologram representing a scene and to be displayed by a display system including a light modulator producing a light beam and a converging optical device designed to make the light beam converge towards a focal point, the scene being defined by luminous elements, the method comprising:

determining values respectively associated with pixels of the digital hologram by summing light contributions respectively produced by the luminous elements with weighting, for each given light contribution, by a correction coefficient that depends on an area of an intersection of (i) a surface located between the converging optical device and the focal point, with (ii) a pencil of light having a predetermined angular aperture and transmitted through the converging optical device from the luminous element producing the given light contribution.

2. The method according to claim 1, wherein the luminous elements are located on a plurality of points of the scene, respectively, and wherein the method further comprises, for each given point of said plurality, calculating, as a function of a position of the given point, the correction coefficient weighting the light contributions produced by the luminous element located at the given point.

3. The method according to claim 2, wherein the determining values comprises, for each given pixel of the digital hologram, determining a field generated, at the given pixel, by the luminous element located at the given point, and weighting the determined field by the correction coefficient calculated for the given point.

4. The method according to claim 3, wherein the display system comprises a shutter interposed between two lenses.

5. The method according to claim 4, wherein an orientation of the shutter is determined as a function of a distribution of the luminous elements in angular sectors defined about an axis of the display system.

6. The method according to claim 5, wherein the determined field is zero when the pencil of light emitted by the luminous element located at the given point with said predetermined angular aperture is entirely intercepted by the shutter.

7. The method according to claim 5, wherein the two lenses have a same focal distance and wherein the shutter is separated from each of the two lenses by a distance equal to the focal distance.

8. The method according to claim 5, wherein the two lenses have a same focal distance and wherein the shutter is separated from each of the two lenses by a distance equal to the focal distance.

9. The method according to claim 4, wherein the two lenses have a same focal distance, and wherein the shutter is separated from each of the two lenses by a distance equal to the focal distance.

10. The method according to claim 3, further comprising displaying the constructed digital hologram by the display system.

11. The method according to claim 2, further comprising displaying the constructed digital hologram by the display system.

12. The method according to claim 1, wherein the luminous elements are located in at least one plane.

13. The method according to claim 12, wherein the determining values comprises propagating a light field from a first plane to a second plane adjacent to the first plane, with application of a matrix whose elements are respectively associated with points of the first plane, each of the elements of the matrix having a value depending on the area of the intersection of said surface and a pencil of light having the predetermined angular aperture and transmitted through the converging optical device from the point associated with said element.

14. The method according to claim 13, further comprising displaying the constructed digital hologram by the display system.

15. The method according to claim 12, further comprising displaying the constructed digital hologram by the display system.

16. The method according to claim 1, further comprising displaying the constructed digital hologram by the display system.

17. The method according to claim 1, wherein said surface is a disk centered on an optical axis of the converging optical device.

18. The method according to claim 1, wherein the predetermined angular aperture is an angular aperture of the light beam generated by the light modulator.

19. A digital holography system comprising:

a construction module configured to construct a digital hologram representing a scene and configured to be displayed by a display system comprising a light modulator producing a light beam, and a converging optical device configured to make the light beam converge towards a focal point, the scene being defined by luminous elements, wherein the construction module is designed to determine values respectively associated with pixels of the digital hologram by summing light contributions respectively produced by the luminous elements with weighting, for each given light contribution, by a correction coefficient that depends on an area of an intersection of (i) a surface located between the converging optical device and the focal point, with (ii) a pencil of light having a predetermined angular aperture and transmitted through the converging optical device from the luminous element producing the given light contribution.

20. The holography system according to claim 19, further comprising said display system.

* * * * *